United States Patent [19]

Searing

[11] Patent Number: 4,819,539
[45] Date of Patent: Apr. 11, 1989

[54] MUSIC TEACHING SYSTEM AND APPARATUS

[76] Inventor: John W. Searing, 92 Ravine Ave., West Caldwell, N.J. 07006

[21] Appl. No.: 196,667

[22] Filed: May 20, 1988

[51] Int. Cl.⁴ .............................................. G09B 15/02
[52] U.S. Cl. ...................................... 84/476; 273/301
[58] Field of Search ................ 84/470 R, 471 R, 476; 273/1 E, 237, 287, 241, 301; 434/159, 167, 168, 172

[56] References Cited

U.S. PATENT DOCUMENTS

| | | | |
|---|---|---|---|
| 621,323 | 3/1899 | Chamberlin | 273/301 |
| 702,298 | 6/1902 | Frederickson | 273/301 |
| 972,335 | 10/1910 | Church | 273/301 |
| 1,139,098 | 5/1915 | Bostwick | 273/301 |
| 1,217,810 | 2/1917 | Noel | 273/301 |
| 1,275,869 | 8/1918 | Deal | 84/471 R |
| 1,526,547 | 2/1925 | Hughey | 84/471 R |
| 1,675,528 | 7/1928 | Bishop | 273/301 |
| 2,231,020 | 2/1941 | McCaulley | 84/470 R X |
| 2,447,213 | 8/1948 | Sledge | 84/470 R |
| 2,582,544 | 1/1952 | Johnson | 84/470 R X |
| 3,375,748 | 4/1968 | Aaron | 84/471 R |
| 3,654,712 | 4/1972 | Bagdasar | 434/172 X |
| 4,227,697 | 10/1980 | Castanis | 434/172 X |
| 4,464,971 | 8/1984 | Dean | 84/471 R |

FOREIGN PATENT DOCUMENTS 22339 12/1895 United Kingdom ................ 84/476

Primary Examiner—L.T. Hix
Assistant Examiner—Brian W. Brown
Attorney, Agent, or Firm—William Lawrence Muckelroy

[57] ABSTRACT

An educational method and apparatus for teaching reading of music to a musical instrument user. One display case is utilized with a treble clef indicia. Another display case is utilized with a base clef indicia. Each case contains unlabeled compartments arranged to represent lines and spaces of the base and treble clefs. Utilizing the prinicpal of memory association in conjunction with flash cards, each note of the scale is represented on a flash card in the form of a noun which begins with the letter for the note it represents. A note location chart is used initially by the user to place each of the flash cards in the compartments of each display case. A fixed number of cards are used. The time to remove each of the cards from a display case is clocked as an audio tape verbally indicates the memory aid, the name of the note and the sound of the note. A card is removed each time a note is generated, the exercise being clocked until all of the cards are removed from a case.

5 Claims, 2 Drawing Sheets

MUSIC TEACHING SYSTEM AND APPARATUS

BACKGROUND OF THE INVENTION

1. Field of the Invention

The present invention relates, in general, to educational tools and display apparatus and in particular to a musical educational apparatus for displaying musical notation for musical instruction and/or use of musical instrumentation, specifically fingering and location of notes on a musical scale.

While the playing of musical instruments and instruction therein have most assuredly progressed over the last several decades, the means for working with notes and understanding the location of notes on the scale and the relationship of the location of notes on an instrument to enable a student to read music and play the comparable note on an instrument has not changed to a significant degree.

Among the conventional means for displaying and learning musical notation are many complex and complicated system not geared to the learning of music or the playing of an instrument by a beginning student who has little or no knowledge of music. Devices which cause a student to make adjustments of physical elements corresponding to the actual adjustments inherent in music have been previously invented and patented. Some of these earlier methods are geared to teaching young students using colors and colored objects. Many others utilize card games.

2. Description of the Prior Art

One of the earliest patents using cards to teach music is the U.S. Patent of Frederickson issued under U.S. Pat. No. 702,298 in 1902. There, Frederickson describes a set of playing cards designed to combine amusement with instruction in the written or printed music staff and notes and in the principles of harmony. Frederickson's system of using playing cards is rather complex and not amenable to the teaching of beginners. The playing cards involve the printing or placing of a portion of the music staff, with the clef mark and different notes thereon, on the faces of the cards, the large note or notes on each card from which that card takes its name representing one value and one tone and the notes on each card differing in value or in tone from those on all of the rest of the cards in the same deck, pack or set. In essence, Frederickson re-adapted the 52 standard playing card deck with musical symbols and notations and devised a novel game using these notations.

Earlier, in 1899, Chamberlin developed another card game for teaching music, U.S. Pat. No. 621,323. Chamberlin noted that previously cards had been adapted to familiarize players with the names and faces of noted authors or to teach natural history or other disciplines. In particular, Chamberlin developed a pack of cards divided into series, suits or books. Each such subdivision illustrating lines, symbols and characters that constitute the rudiments of the science of music.

In 1910, Church in U.S. Pat. No. 972,335 developed and disclosed an educational game device to teach rhythm. Church's game was directed to providing a pupil a strong clear sense of rhythmic pulsation giving particular focus to each note being given a time value or a fraction of one or more counts. Church necessarily involved the application of fractions to an understanding and play of the game. Again, the game was complex, having a complex set of rules and could not be easily understood by a beginner.

In 1917, Noel developed another card game for teaching music, U.S. Pat. No. 1,217,810. His invention was an interesting and positive method by which children, as well as adults, were to learn the rudiments of music without any apparent mental effort and thus eliminate the tedious and tiresome task of memorizing the musical terms and phrases. Unfortunately, Noel's cards were rather complex and were not easily understood by children in the five to ten year age group. The game provided fifty-five playing cards with complex musical notations thereon. A year later, Winnie Deal patented another musical card playing game, U.S. Pat. No. 1,275,869. Her invention provided a deck of playing cards suitable for use at musical gatherings, club meetings and other social occasions in order that the players could play the cards and become familiar with musical scale signatures, key notes and formulas. Again, the notations on the cards were quite complex in comparison to the novel invention and were directed to musical scale signatures for the teaching of sharps and flats in an effort to impart knowledge of musical theory.

Fifty years later in 1968, Aaron in U.S. Pat. No. 3,375,748 patented a new teaching device for musical notation. This invention also involved a musical game. It was directed to permitting the teaching of musical notation to children of the lower age group, such as pre-school age students four or five years of age. Aaron's device required a grid having equally spaced vertical lines and equally spaced horizontal lines, a representation of at least a part of a piano keyboard on one side of the grid and a means for indicating by vertical position on the grid the pitch of a selected note and by horizontal extent on the grid the duration of the selected note. Again, this method also went well beyond teaching the basic scale and by the complexity of its grid required detailed explanation for effective use by beginners.

In 1928, prior to Aaron's invention, Bishop in U.S. Pat. No. 1,675,528 entitled "Instructional Music—Harmony Card Game" attempted improvements in the prior musical card harmony games. Again, the cards for this particular game involved complex notations on cards not easily discernable or learnable by young school children. The Bishop patent, although markedly different, was not a substantial improvement over the musical educational card game of Bostwic patented on May 11, 1915. Also, prior to Aaron, another card game using complex notations on individual cards was developed and patented by Hannah Johnson as U.S. Pat. No. 2,582,544. Its major objective was to provide players with the facilities and cards necessary to learn or recognize octaves at a glance. Her card game required a number of cards with a staff printed thereon, the cards were made up of books of three cards each, of the cards of each book having three pitch notes thereon positioned on its staff and different from the pitch notes of the other books, adjacent notes of each card being an octave apart, one of the three pitch notes being on a different time value than the other two notes and the different time value note on any one card of a book being of a different octave note than the corresponding note of each of the other two cards of the book. This was a delightfully complex game to play in spite of its novel objective to provide learning at a glance.

It is noteworthy to also mention that Fanny Hughey, in 1921, was awarded U.S. Pat. No. 1,526,547 for an instructional set. Her invention was an apparatus for teaching music to young children by the aid of colors and colored objects. Specifically, she provided a means for teaching music using distinctive colors to represent the different tones in a musical scale with the intent that a child would associate a color with a particular note that it represents. She used colored markers in combination with the keyboard of a piano or a chart representing such a keyboard and colored pictures, preferably of birds of the same colors as markers. The pictures were used for the purpose of teaching a child a musical tone which the color of each picture signified. The markers were used for the purpose of identifying keys of the piano corresponding to the colors and tones. In the midst of all of this, approximately twenty years later, McCaulley developed another card game musical instruction device, U.S. Pat. No. 2,231,020. This invention was designed to cause the student to select units from different series of physical elements in a symbol then to make up sequences corresponding to note combinations inherent in music, such as scales and chords. Its major undertaking involved the teaching of major scales, sharp notes or flat notes. Again, its cards were complex and not easily comprehended or understood by children.

OBJECTS OF THE INVENTION

It is thus an object of the present invention to provide a modular apparatus and system for music education capable of providing substantial flexibility for use as desired by a music teacher and pre-school pupil having only a rudimentary knowledge of the alphabet or which can be used for self instruction to either learn music or learn the placement of notes on a musical instrument.

It is a primary object of the novel invention to provide a method and apparatus in which by the recurrent use thereof basic notes of both the treble and bass clefs may be recognized and learned for easy and quick music reading. It is another object of the novel invention to provide a method wherein the notes on a scale are maintained on a single octave arrangement and thereby not so involved that a user loses interest or lacks interest.

It is yet another object of the present invention to provide a musical education apparatus for displaying musical notation which permits convenient removability and replacement of notation to accomodate the "trial and error process" in musical instruction.

It is also yet an additional object of the present invention to provide such a display apparatus which promotes tangible association between notes and sounds with manipulatable notation pieces, for example cards.

It is still yet another object to provide a teaching system especially for younger music students who by manipulating and moving cards with visual symbols of the various notes thereon placed in an apparatus which is an analogue of a musical scale, easily learn music.

These and other objects of the novel invention shall become apparent from the detailed specification of the presently preferred embodiment below.

SUMMARY OF THE INVENTION

The present invention is a device and method which uses a music education apparatus for displaying musical notation during the instruction of music, specifically the teaching of basic music notes and their relationship to a musical scale. The apparatus itself includes a display case representing a scale for the bass clef and a scale for the treble clef with compartments therein containing cards with illustrations of various nouns beginning with a letter representing a musical note appropriate for that particular portion of a music scale. The method involves utilizing a musical game wherein an audio tape generates the name of a noun beginning with the letter of a note, the name of the note and then the sound of the note after which a student, by trial and error, selects a card from the appropriate compartment which he believes represents the note generated. The time necessary for the student to select the correct card for the note played from the display case compartment is monitored and displayed. The object of the game is for the student or user to be able to select a given sequence and variety of notes in as short a period of time as possible in conformity with the rate at which notes are generated from the audio tape. For teaching the location of notes on an instrument, a guitar for example, the display case is adapted to resemble the instrument.

BRIEF DESCRIPTION OF THE DRAWINGS

FIG. 3 is a view of the cards utilized with the apparatus shown in FIG. 1.

DETAILED DESCRIPTION OF THE PREFERRED EMBODIMENT OF THE INVENTION

Figure 1:
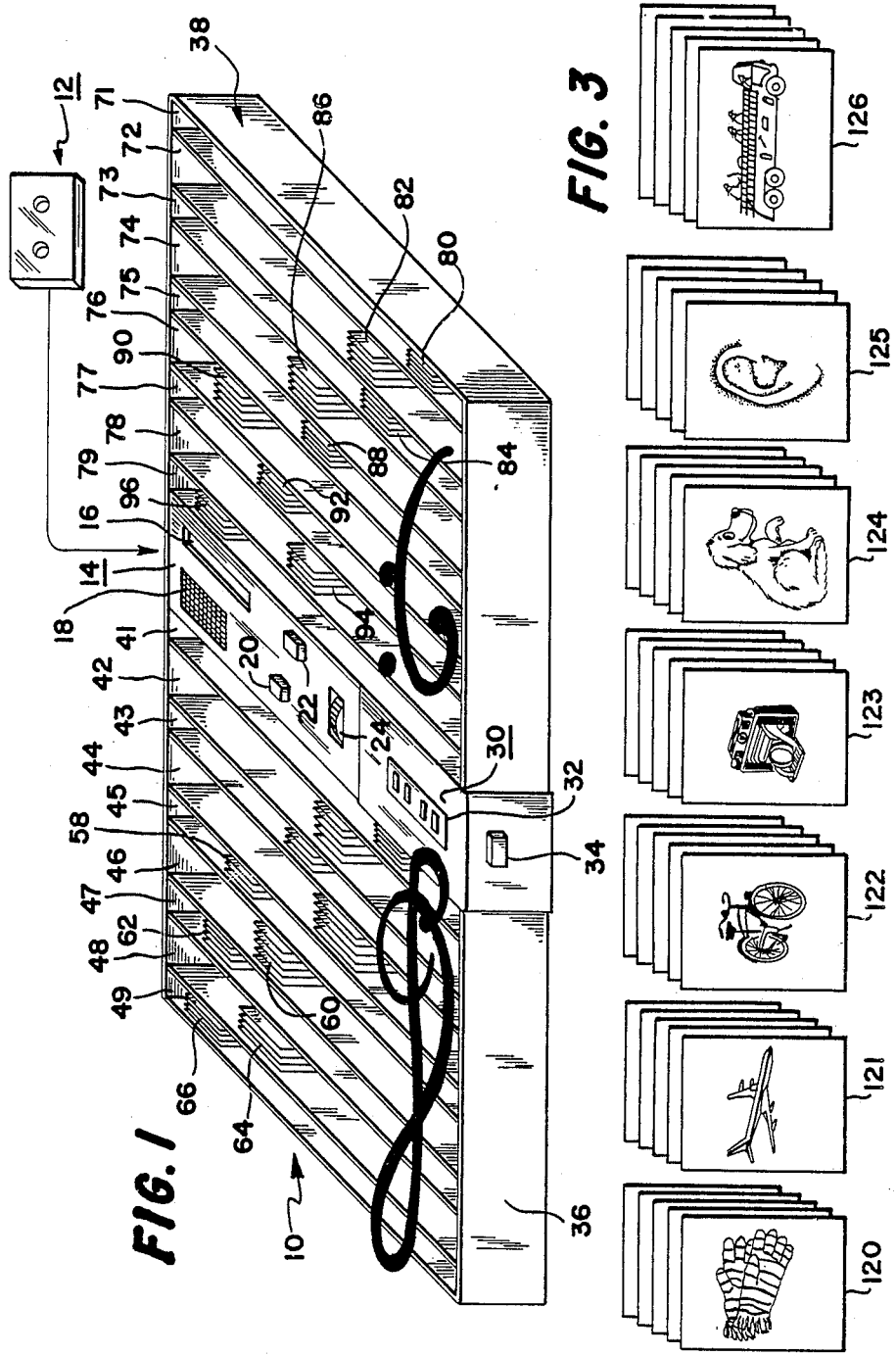
FIG. 1 is a perspective view of the educational apparatus of the present invention.

While the novel invention is susceptible of embodiment in many different forms, there is shown in the drawings and hereinafter described in detail, a specific embodiment with the understanding that the present disclosure is to be considered an exemplification of the principles of the invention as presently used. It is not intended to limit the invention to the embodiment illustrated.

The novel educational apparatus for teaching music, the musical scale and musical notes is shown in FIG. 1 as an apparatus 10 which incorporates a cassette 12. The cassette 12 has audio portions, side A and side B, for example, as follows:

SIDE A

This is side "A".. learning the G clef or treble notes. Each note on the clef is represented by a memory aid. For example.. in the first space, there is a picture of a finger. Finger starts with "F". The note in that space is "F".

Each note of the scale has a memory aid. There are five cards for each note. If you have not already done so, place all the cards into their correct compartment in the display case. Use of the location chart will be helpful at first in learning each note's location. After a few days, it will no longer be needed.

During the next ten minutes or so, you will be told at random, the name of a memory aid, then the name of the note. Following that, the note will be played on the piano. When you hear the note, remove that card from the correct compartments of the display case..... Glove - Door - Clock - Fan - Camera - Arrow - Elevator -Button -Eye - Dice - Finger - Arrow - Eye - Camera - Clock - Dice - Fan -Elevator - Button - Finger - Door - Glove - Clock - Arrow - Glove -Fan - Door - Camera - Dice - Button - Elevator - Eye - Finger - Fan - Camera

- Clock - Eye - Elevator - Button - Dice - Door - Glove -Arrow - Finger - Elevator - Eye - Glove - Clock - Camera - Arrow -Fan - Door - Dice - Finger - Button.

SIDE B

This is side "B".. learning the F or bass notes....

Drum - Clock - Arrow - Ear - Ghost - Bow - Foot - Ambulance - Glass - Chair - Bell - Ghost - Bell - Glass - Clock - Ear - Drum - Bow -Chair - Arrow - Foot - Ambulance - Chair - Clock - Ambulance -Ghost - Bell - Ear - Drum - Bow - Foot - Glass - Arrow - Ambulance - Bow - Bell - Glass - Ghost - Drum - Foot - Clock - Chair - Arrow - Ear - Drum - Glass - Ghost - Bell - Bow - Arrow - Foot -Ambulance - Ear - Clock - Chair.

The apparatus 10 is comprised of a player 14 for playing audio tape cassettes. The cassette player 14 is incorporated as an integral part of the apparatus 10. The cassette player 14 has a slot 16 for insertion of the cassette 12, for example. Adjacent the slot 16 is a speaker 18. Additional controls comprise an on/off switch 20 and a pause switch 22. Volume of the cassette player is controlled by a rotating dial 24 thereon.

The apparatus 10 also has an elapsed time indicator 30 which measures elapsed time in minutes and seconds, for example. The elapsed time indicator 30 has an indicator screen 32 which digitally displays the elapsed time in minutes and seconds, for example. An on/off switch 34 is located on the side of the apparatus 10, for example. In the embodiment shown, there is a display case 36 for the treble clef shown detachably mounted to the timer 30 and cassette player 14. There is also shown detachably mounted to the timer 30 and cassette player 14 another display case 38 for the base clef.

The display case 36 represents the treble or G clef and is made of nine sub-compartments 41, 42, 43, 44, 45, 46, 47, 48, and 49. The sub-compartments 41, 43, 45, 47 and 49 are made of a dark colored material, for example black acrylic. The compartments 42, 44, 46 and 48 are light colored and made of a white acrylic, for example. When facing the display case 36 located to the left most aspect of each of the compartments 41, 42, 43, 44, 45, 46, 47, 48 and 49 is a dark symbol of a treble clef of acrylic, for example, which extends from the compartment 41 to the compartment 49. The compartments 41, 42, 43, 44, 45, 46, 47, 48 and 49 are arranged in the order specified adjacent one another in a manner which resembles a musical scale. The compartments 41, 43, 45, 47 and 49 are narrow in relationship to the adjacent compartments 42, 44, 46 and 48 so as to provide the appearance of lines on a scale in relationship to the light colored compartments 42, 44, 46 and 48 which are dimensionally sized to indicate spaces of the scale in relationship to said dark colored compartments 41, 43, 45, 47 and 49.

There is shown in the dark colored compartment 41 a deck 50 of cards, five in number for example. The compartment 41 is sized and oriented with respect to the other compartments 42, 43, 44, 45, 46, 47, 48 and 49 to represent the line E on a musical scale. Likewise, the deck 50 comprises cards having depicted thereon various nouns which are spelled starting with the letter E. Similarly, the compartment 42 is analogous the space F on the musical scale and a deck 52 of cards is located in this compartment. Each card of the deck 52 has a picture thereon of a noun which begins its spelling with the alphabet F to correspond to the musical note F. Similarly, compartment 43 is analogous to the line C on the musical scale and a deck 54 contained within the compartment is comprised of cards each having a picture of a noun thereon which starts its spelling with the alphabet C to correspond to the musical note C associated with this line of the musical scale. Compartment 44 is light colored and analogous to the space A of the musical scale and a deck 56 inside this compartment depicts a variety of nouns which begin their spelling with the alphabet A to conform or represent the space A for the note A on the musical scale. The compartment 45, dark colored, is analogous to the line for the note B on the musical scale and a deck 58 therein is comprised of cards each having a noun depicted thereon which begins its spelling with the alphabet B to correspond to the musical note B. The compartment 46 is analogous to the space of the musical scale associated with the musical note C.

A deck 60 of cards is located in this compartment. Each card of the deck 60 has a depiction of a noun which begins its spelling with the alphabet C. For example, a picture of a camera appears on one of the cards of the deck 60. The pictures on each of the cards in the deck 60 begins its spelling with the alphabet C to correspond to the musical note C.

The compartment 47 is dark colored and spatially arranged to be analogous to the line for the note D of the musical scale. Located in the compartment 47 is another deck 62. The deck 62 is comprised of cards depicting nouns beginning with the alphabet D, for example a dragon. Likewise, the compartment 48 is analogous to the space for the note E of the musical scale and the deck 64 therein is comprised of cards which show pictorially nouns beginning with the alphabet E, for example a picture of a human eye. Lastly, the compartment 49, which is narrow and dark colored, represents the line for the note F of the musical scale and the deck 66 of cards therein shows a variety of nouns beginning with the alphabet F, for example a football.

The display case 38 represents the bass or F clef and is made of nine sub-compartments 71, 72, 73, 74, 75, 76, 77, 78 and 79. The sub-compartments 71, 73, 75, 77 and 79 are made of a dark colored material, for example black acrylic. The compartments 72, 74, 76 and 78 are light colored and made of a white acrylic, for example. When facing the display case 38 located to the left most aspect of each of the compartments 71, 72, 73, 74, 75, 76, 77, 78 and 79 is a dark symbol of a bass clef of acrylic, for example, which extends from the compartment 71 to the compartment 79. The compartments 71, 72, 73, 74, 75, 76, 77, 78 and 79 are arranged in the order specified adjacent one another in a manner which resembles a musical scale. The compartments 71, 73, 75, 77 and 79 are narrow in relationship to the adjacent compartments 72, 74, 76 and 78 so as to provide the appearance of lines on a scale in relationship to the light colored compartments 72, 74, 76 and 78 which are dimensionally sized to indicate spaces of the scale in relationship to said dark colored compartments 71, 73, 75, 77 and 79.

There is shown in the dark colored compartment 71 a deck 80 of cards, five in number for example. The compartment 71 is sized and oriented with respect to the other compartments 72, 73, 74, 75, 76, 77, 78 and 79 to represent the line E on a musical scale. Likewise, the deck 80 comprises cards having depicted thereon various nouns which are spelled starting with the letter E. Similarly, the compartment 72 is analogous to the space F on the musical scale and a deck 82 of cards is located in this compartment. Each card of the deck 82 has a picture thereon of a noun which begins its spelling with the alphabet F to correspond to the musical note F. Similarly, compartment 73 is analogous to the line C on the musical scale and a deck 84 contained within the compartment is comprised of cards each having a picture of a noun thereon which starts its spelling with the alphabet C to correspond to the musical note C associated with this line of the musical scale. Compartment 74 is light colored and analogous to the space A of the musical scale and a deck 86 inside this compartment depicts a variety of nouns which begin their spelling with the alphabet A to conform or represent the space A for the note A on the musical scale. The compartment 75, dark colored, is analogous to the line for the note B on the musical scale and a deck 88 therein is comprised of cards each having a noun depicted thereon which begins its spelling with the alphabet B to correspond to the musical note B. The compartment 76 is analogous to the space of the musical scale associated with the musical note C.

A deck 90 of cards is located in this compartment. Each card of the deck 90 has a depiction of a noun which begins its spelling with the alphabet C. For example, a picture of a camera appears on one of the cards of the deck 90. The pictures on each of the cards in the deck 90 begins its spelling with the alphabet C to correspond to the musical note C.

The compartment 77 is dark colored and spatially arranged to be analogous to the line for the note D of the musical scale. Located in the compartment 77 is another deck 92. The deck 92 is comprised of cards depicting nouns beginning with the alphabet D, for example a dragon. Likewise, the compartment 78 is analogous to the space for the note E of the musical scale and the deck 94 therein is comprised of cards which show pictorially nouns beginning with the alphabet E, for example a picture of a human eye. Lastly, the compartment 79, which is narrow and dark colored, represents the line for the note F of the musical scale and the deck 96 of cards therein shows a variety of nouns beginning with the alphabet F, for example a football.

Figure 2:
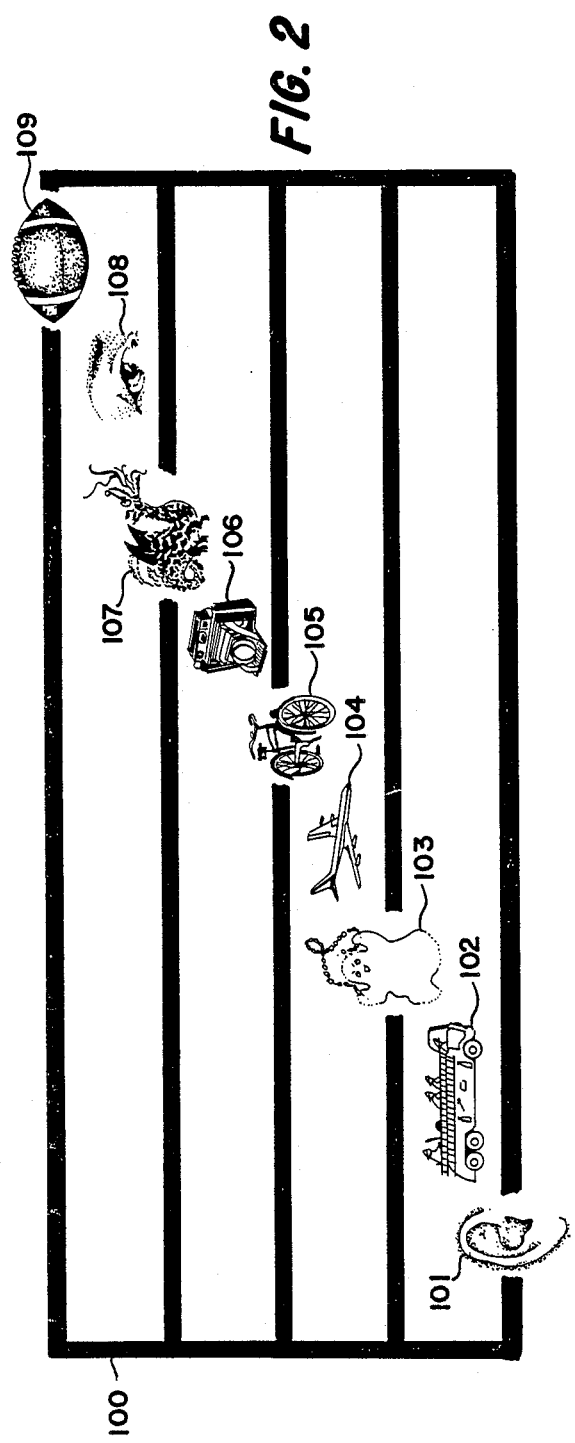
FIG. 2 is a line and space grid analogous to a conventional musical scale.

There is shown in FIG. 2 a line and space grid 100 analogous to a conventional musical scale. Shown on the grid 100 are a variety of pictures of nouns which begin with various letters of the alphabet. The pictures are spaced on the grid to correspond to locations for musical notes E, F, G, A, B, C, D, E and F. For example, a picture of an ear 101 depicts the musical note E; a picture of a firetruck 102 depicts the musical note F; a picture of a ghost 103 depicts the musical note G; a picture of an airplane 104 depicts the musical note A; a picture of a bicycle 105 depicts the musical note B; a picture of a camera 106 depicts the musical note C; a picture of a dragon 107 depicts the musical note D; a picture of a human eye 108 depicts the musical note E; and, a picture of a football 109 depicts the musical note F.

Instructions are provided with the apparatus 10 shown in FIG. 1 to utilize the grid 100 as shown in FIG. 2 to first organize all of the cards in the decks 50, 52, 54, 56, 58, 60, 62, 64, 66, 80, 82, 84, 86, 88, 90, 92, 94 and 96 into alphabetical order according to the beginning letter for the noun depicted and then, for example, insert a portion of the cards beginning with the letter E into the slot 41 of the display case 36, for example, and then another equal portion from the remainder of the cards depicting nouns beginning with the letter E into the compartment 71 of the display case 38 for the bass clef using the grid shown in FIG. 2, for example, as a guide.

Figure 4:
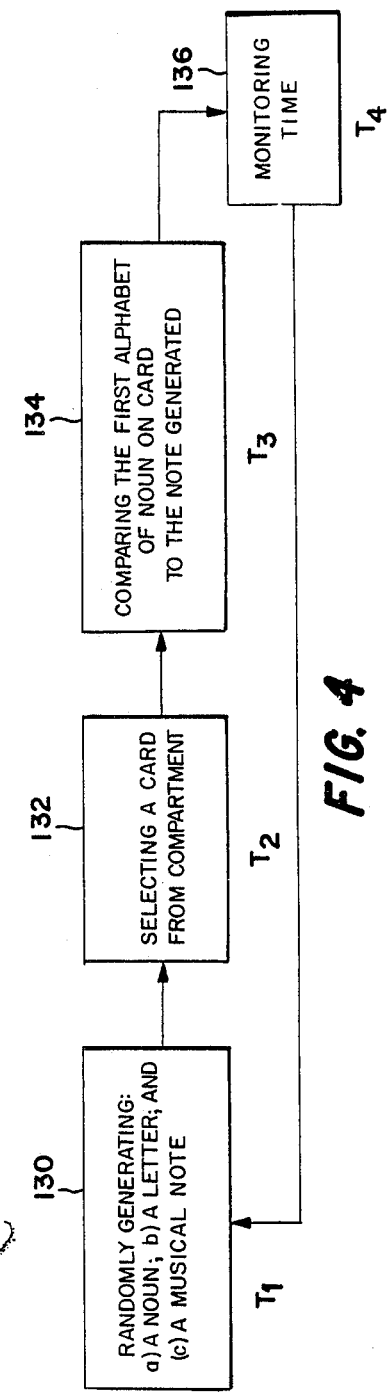
FIG. 4 is a block diagram showing the teaching method of the present invention.

There is shown in a block diagram in FIG. 4 the teaching method of the invention. As shown in block 130, the first step in the novel teaching method is to utilize the cassette 12 as shown in FIG. 1 to randomly generate a noun, then a letter, for example "C", which represents the beginning letter with which the noun is spelled and then thirdly to utilize the cassette player 14 to generate one of the musical notes "C" from a musical instrument, for example a piano. The noun may be, for example the word "camera" pronounced by a voice on the audio tape of the cassette 12. If so, then the letter pronounced on the cassette 12 is "C" and the musical note played on the piano, for example is one of the musical notes "C". Prior to beginning the first step, the button 34 of the timer 30 is depressed to activate the display 32 to show elapsed time. The next step is then to direct the pupil or for the user to select a card from one of said compartments of the apparatus 10.

The user is directed to at first, at the beginning of the instruction, to utilize the chart shown in FIG. 2 to assist in selecting a card from the proper compartment of either the bass or treble clef. According to specific directions on the audio tape cassette. This step is indicated in block 132 of the flow chart of FIG. 4.

Next, the user, according to instructions accompanying the apparatus, is directed to compare the first alphabet and the spelling of the noun on the card to the musical note generated in step 130. This comparing step is depicted in block form in a block 134.

The next step for the user is to monitor the time displayed on the digital display 32 of FIG. 1 and at the end of the instruction or learning period to depress the activation/de-activation switch 34 for the timer 30. This step of monitoring time is depicted in a block 136 of FIG. 4.

The generating step 130 of FIG. 4 occurs at time $T_1$. The selecting step 132 occurs at time $T_2$. The comparing step 134 occurs at time $T_3$. Time monitoring using the elapsed time clock 30 (shown in FIG. 1) occurs at time $T_4$. The time elapsed or the time required by the user to return to $T_1$ or step 130 of the process may be recorded to note and monitor student or user progress. In most instances, $T_1$ will equal to zero and the time for selecting, comparing and putting aside a card will be shown on the elapsed time display 32 which time will equal the sum of $T_2$ plus $T_3$ plus $T_4$.

It is noted that the method disclosed herein may be easily adapted to teach a student or user finger position on an instrument such as a guitar or piano, for example. A teacher need only substitute a musical instrument for the cases 36 and 38 and hold up the cards, such as shown in FIG. 3 to the student after basic scale instruction has been completed. Thus, the apparatus 10 shown in FIG. 1 may be adapted for use in combination with multiples of cards 120, 121, 122, 123, 124, 125 and 126 such as shown in FIG. 3, and the combination utilized to teach fingering of a guitar, piano or other musical instrument.

What is claimed is:

1. In an educational method for teaching musical notes utilizing the following:
    (a) a first display means for displaying:
    a first plurality of individual images of nouns beginning with the letter D corresponding to a musical note D;

a first plurality of individual images of nouns beginning with the letter E corresponding to a musical note E;

a first plurality of individual images of nouns beginning with the letter F corresponding to a musical note F;

a first plurality of individual images of nouns beginning with the letter G corresponding to a musical note G;

a first plurality of individual images of nouns beginning with the letter A corresponding to a musical note A;

a first plurality of individual images of nouns beginnig with the letter B corresponding to a musical note B;

a first of individual images of nouns beginning with the letter C corresponding to the musical note C;

a second plurality of individual images of nouns beginning with the letter D corresponding to the musical note D;

a second plurality of individual images of nouns beginning with the letter E corresponding to the musical note E; and, a second plurality of individual images of nouns beginning with the letter F corresponding to the musical note F;

(b) a treble clef holding means for holding said first display means, said holding means comprising a dark colored receptacle containing a portion of said display means, said portion being those displayed nouns representing each of the treble line notes E, G, B, D and F, respectively, said dark colored receptacles each separated by a light colored receptacle containing another portion of said display means, said portion being those displayed nouns representing each of the treble space notes F, A, C and E, respectively, said receptacles being arranged adjacent each other to conform to a musical scale arrangement comprising the notes E, F, G, A, B, C, D, E and F, said treble clef holding means having a treble clef symbol located thereon; and, (c) a second display means for individually displaying:

a third plurality of individual images of nouns beginning with the letter D corresponding to the musical note D;

a third plurality of individual images of nouns beginning with the letter E corresponding to the musical note E;

a third plurality of individual images of nouns beginning with the letter F corresponding to a musical note F;

a second plurality of individual images of nouns beginning with the letter G corresponding to the musical note G;

a second plurality of individual images of nouns beginning with the letter A corresponding to the musical note A;

a second plurality of individual images of nouns beginning with the letter B corresponding to the musical note B;

a second plurality of individual images of nouns beginning with the letter C corresponding to the musical note C;

a fourth plurality of individual images of nouns beginning with the letter D corresponding to the musical note D;

a fourth plurality of individual images of nouns beginning with the letter E corresponding to the musical note E; and, a fourth plurality of individual images of nouns beginning with the letter F corresponding to the musical note F; and, (d) bass clef holding means for holding said second display means, said holding means comprising a dark colored receptacle containing a portion of said display means, said portion being those displayed nouns representing each of the respective images of the notes E, C, B, D and F, said dark colored receptacles each separate a light colored receptacle containing another portion of said display means, said portion being those displayed nouns representing each of the respective images of the notes F, A, C and E, said receptacles being arranged adjacent each other to conform to a musical scale arrangement comprising the notes E, F, C, A, B, C, D, E, F and G, said bass clef holding means having a bass clef symbol located thereon; and, (e) an audio means for producing a sound representative of one of the musical notes A, B, C, D, E, F and G in the treble clef and in the bass clef;

the method comprising the steps of:

(1) randomly generating a sound representing one of the musical notes A, B, C, D, E, F or G from either the bass clef or the treble clef;

(2) directing a user to select an image from the treble clef or bass clef holding means which corresponds to said randomly generated sound;

(3) selecting an image in response to said randomly generated sound;

(4) providing a display of elapsed time required for selecting an image according to step three of the method; and, (5) repeating steps (1) through (4) a finite number of times whereby a user is taught a location for each musical note which location is displayed in relationship to a musical scale.

2. The method of claim 1 wherein said first display means comprises sets of cards wherein said images of nouns are displayed thereon, said first display means beginning with a letter of the alphabet selected from the group consisting of A, B, C, D, E, F and G and wherein said second display means comprises other sets of cards with images of nouns displayed thereon, said nouns beginning with the above said letters of the alphabet.

3. The method of claim 2 wherein said treble holding means and said base holding means are each comprised of a rectangular box having dark colored longitudinal compartments alternating with light colored longitudinal compartments whereby each said rectangular box resembles a musical scale.

4. An apparatus for teaching music comprising:

(a) first display means for displaying:

a first plurality of individual images of nouns beginning with the letter D corresponding to a musical note D;

a first plurality of individual images of nouns beginning with the letter E corresponding to a musical note E;

a first plurality of individual images of nouns beginning with the letter F corresponding to a musical note F;

a first plurality of individual images of nouns beginning with the letter G corresponding to a musical note G;

a first plurality of individual images of nouns beginning with the letter A corresponding to a musical note A;

a first plurality of individual images of nouns beginning with the letter B corresponding to a musical note B;

a first plurality of individual images of nouns beginning with the letter C corresponding to the musical note C;

a second plurality of individual images of nouns beginning with the letter D corresponding to the musical note D;

a second plurality of individual images of nouns beginning with the letter E corresponding to the musical note E; and, a second plurality of individual images of nouns beginning with the letter F corresponding to the musical note F;

(b) a treble clef holding means for holding said first display means, said holding means comprising a dark colored receptacle containing a portion of said display means, said portion being those displayed nouns representing each of the treble line notes E, G, B, D and F, respectively, said dark colored receptacles each separated by a light colored receptacle containing another portion of said display means, said portion being those displayed nouns representing each of the treble space notes F, A, C and E, respectively, said receptacles being arranged adjacent each other to conform to a musical scale arrangement comprising the notes E, F, G, A, B, C, D, E and F, said treble clef holding means having a symbol of a treble clef located thereon; and, (c) a second display means for individually displaying:

a third plurality of individual images of nouns beginning with the letter D corresponding to the musical note D;

a third plurality of individual images of nouns beginning with the letter E corresponding to the musical note E;

a third plurality of individual images of nouns beginning with the letter F corresponding to a musical note F;

a second plurality of individual images of nouns beginning with the letter G corresponding to the musical note G;

a second plurality of individual images of nouns beginning with the letter A corresponding to the musical note A;

a second plurality of individual images of nouns beginning with the letter B corresponding to the musical note B;

a second plurality of individual images of nouns beginning with the letter C corresponding to the musical note C;

a fourth plurality of individual images of nouns beginning with the letter D corresponding to the musical note D;

a fourth plurality of individual images of nouns beginning with the letter E corresponding to the musical note E; and, a fourth plurality of individual images of nouns beginning with the letter F corresponding to the musical note F; and, (d) bass clef holding means for holding said second display means, said holding means comprising a dark colored receptacle containing a portion of said display means, said portion being those displayed nouns representing each of the respective images of the notes E, C, B, D and F, said dark colored receptacles each separate a light colored receptacle containing another portion of said display means, said portion being those displayed nouns representing each of the respective images of the notes F, A, C and E, said receptacles being arranged adjacent each other to conform to a musical scale arrangement comprising the notes E, F, C, A, B, C, D, E, F and G, said base clef holding means having a symbol of a bass clef located thereon; and, (e) an audio means for producing a sound representing each of the musical notes A, B, C, D, E, F and G in the treble clef and in bass clef wherein said treble holding means and said bass holding means are each comprised of a rectangular box having dark colored longitudinal compartments alternating with light colored longitudinal compartments whereby each said rectangular box resembles a musical scale.

5. An apparatus for teaching music comprising:
(a) a first display means for displaying:

a first plurality of individual images of nouns beginning with the letter D corresponding to a musical note D;

a first plurality of individual images of nouns beginning with the letter E corresponding to a musical note E;

a first plurality of individual images of nouns beginning with the letter F corresponding to a musical note F;

a first plurality of individual images of nouns beginning with the letter G corresponding to a musical note G;

a first plurality of individual images of nouns beginning with the letter A corresponding to a musical note A;

a first plurality of individual images of nouns beginning with the letter B corresponding to a musical note B;

a first plurality of individual images of nouns beginning with the letter C corresponding to the musical note C;

a second plurality of individual images of nouns beginning with the letter D corresponding to the musical note D;

a second plurality of individual images of nouns beginning with the letter E corresponding to the musical note E; and, a second plurality of individual images of nouns beginning with the letter F corresponding to the musical note F;

(b) a treble clef holding means for holding said first display means, said holding means comprising a dark colored receptacle containing a portion of said display means, said portion being those displayed nouns representing each of the treble line notes E, G, B, D and F, respectively, said dark colored receptacles each separated by a light colored receptacle containing another portion of said display means, said portion being those displayed nouns representing each of the treble space notes F, A, C and E, respectively, said receptacles being arranged adjacent each other to conform to a musical scale arrangement comprising the notes E, F, G, A, B, C, D, E and F, said treble clef holding means having a symbol of a treble clef located thereon; and, (c) a second display means for individually displaying:

a third plurality of individual images of nouns beginning with the letter D corresponding to the musical note D;

a third plurality of individual images of nouns beginning with the letter E corresponding to the musical note E;

a third plurality of individual images of nouns beginning with the letter F corresponding to a musical note F;

a second plurality of individual images of nouns beginning with the letter G corresponding to the musical note G;

a second plurality of individual images of nouns beginning with the letter A corresponding to the musical note A;

a second plurality of individual images of nouns beginning with the letter B corresponding to the musical note B;

a second plurality of individual images of nouns beginning with the letter C corresponding to the muscial note C;

a fourth plurality of individual images of nouns beginning with the letter D corresponding to the musical note D;

a fourth plurality of individual images of nouns beginning with the letter E corresponding to the musical note E; and, a fourth plurality of individual images of nouns beginning with the letter F corresponding to the musical note F; and, (d) bass clef holding means for holding said second display means, said holding means comprising a dark colored receptacle containing a portion of said display means, said portion being those displayed nouns representing each of the respective images of the notes E, C, B, D and F, said dark colored receptacles each separate a light colored receptacle containing another portion of said display means, said portion being those displayed nouns representing each of the respective images of the notes F, A, C and E, said receptacles being arranged adjacent each other to conform to a musical scale arrangement comprising the notes E, F, C, A, B, C, D, E, F and G, said bass clef holding means having a symbol of a bass clef located thereon; and, (e) an audio means for producing a sound representing each of the musical notes A, B, C, D, E, F and G in the treble clef and in bass clef.

* * * * *